United States Patent [19]

Morton

[11] 4,290,618

[45] Sep. 22, 1981

[54] HAND TRUCK STAIR TREAD ENGAGING DEVICE

[75] Inventor: John C. Morton, Yuba City, Calif.

[73] Assignee: Clamor Company, Marysville, Calif.

[21] Appl. No.: 30,459

[22] Filed: Apr. 16, 1979

[51] Int. Cl.³ .............................................. B62B 5/02
[52] U.S. Cl. ................................. 280/5.22; 180/9.22; 305/17; 305/28
[58] Field of Search .............. 280/5.22, 5.2, DIG. 10; 308/20; 305/16, 17, 25, 28; 180/9.2 R, 9.2 C, 9.22, 8 A; 172/285

[56] References Cited

U.S. PATENT DOCUMENTS

| | | | |
|---|---|---|---|
| 1,583,114 | 5/1926 | Bierly | 280/11.1 ET |
| 2,193,283 | 3/1940 | Harberson | 280/5.22 |
| 2,260,027 | 10/1941 | Hotson | 280/11.1 ET |
| 2,620,041 | 12/1952 | Chenette | 280/5.22 |
| 4,136,888 | 1/1979 | Bowie | 280/5.22 |

*Primary Examiner*—Joseph F. Peters, Jr.
*Assistant Examiner*—Randall A. Schrecengost
*Attorney, Agent, or Firm*—Mark C. Jacobs

[57] ABSTRACT

In a conventional hand truck, a stair tread engaging device having reduced friction and improved mobility provided by a plurality of rollers each rotating freely in its own socket and only on its own axis without forward movement.

12 Claims, 17 Drawing Figures

HAND TRUCK STAIR TREAD ENGAGING DEVICE

BACKGROUND OF THE INVENTION

1. Field of the Invention

The invention relates to hand trucks; and, more particularly, to a stair tread engaging device used on a hand truck to provide better mobility of the hand truck.

2. Description of the Prior Art

Hand trucks have been known for many years and are used to tote heavy loads from one location to another. Generally speaking, such hand trucks comprise wheels which rotate along a surface. The wheels alone, however, are not suitable for moving the hand truck up and down stairs or the like. For this reason, stair tread engaging devices have been suggested for facilitating movement of the truck on stairways by allowing free movement of the truck on stairways by allowing free movement of the truck body with respect to the stair treads. One such device is disclosed in U.S. Pat. No. 2,301,341 to Stevens et al and such device cooperates with the truck wheels to enable the user to easily and expeditiously handle a loaded truck in ascending and descending a stairway.

However, devices of the type known in the past rely on a plurality of bearings as roller means which abut against each other while freely moving around the track of the tread engaging device. If one of these bearings sticks, the rest jam up stopping movement of the bearings or rollers in the track. Thus, any twisting or turning of such device might cause all of the roller means to jam. There is thus a need for a stair tread engaging device which has reduced friction in movement and is non-jamming.

SUMMARY OF THE INVENTION

It is an object of this invention to provide a stair tread engaging device for a hand truck which is non-jamming and has reduced friction in travelling up and down stairs.

It is a further object of this invention to carry out the foregoing objects by providing a plurality of independently mounted non-abutting rollers in the track of the device.

These and other objects are preferably accomplished by providing a stair tread engaging device which is mounted adjacent the wheels of a hand truck and provides reduced friction and improved mobility by means of a plurality of rollers, each rotating freely in its own socket and on its own axis without forward movement in the track of the device.

DESCRIPTION OF THE PREFERRED EMBODIMENT

Figure 1:
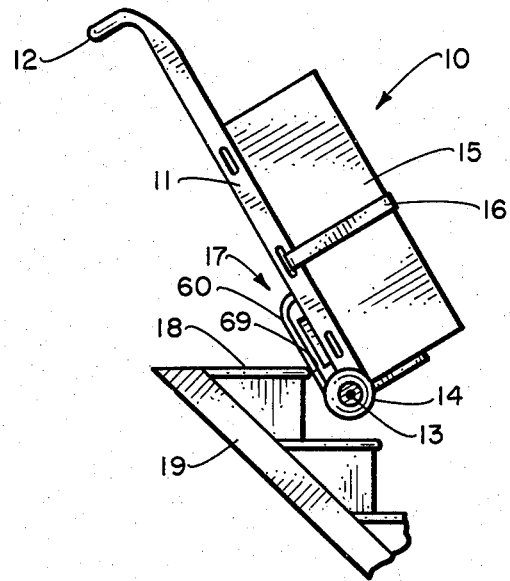
FIG. 1 is a vertical view of the stair tread engaging device of my invention installed on a conventional hand truck.

Referring now to FIG. 1 of the drawing, a conventional hand truck 10 is shown comprised of a pair of spaced parallel side members 11 (only one visible in FIG. 1) which may taper to a narrow spacing therebetween to handle 12 at one end and widen at the other end where members 11 are interconnected by an axle 13 receiving and having journalled thereon wheels 14 of any suitable type. A load 15 is shown secured on truck 10 by strap 16. The hand truck 10 may include other well-known features and does not form any part of my invention. The truck 10, however, as particularly contemplated in my invention, includes improved stair tread engaging means 17 shown in FIG. 1 as engaging the tread 18 of stairs 19, on the lip 69 thereof.

Figure 2:
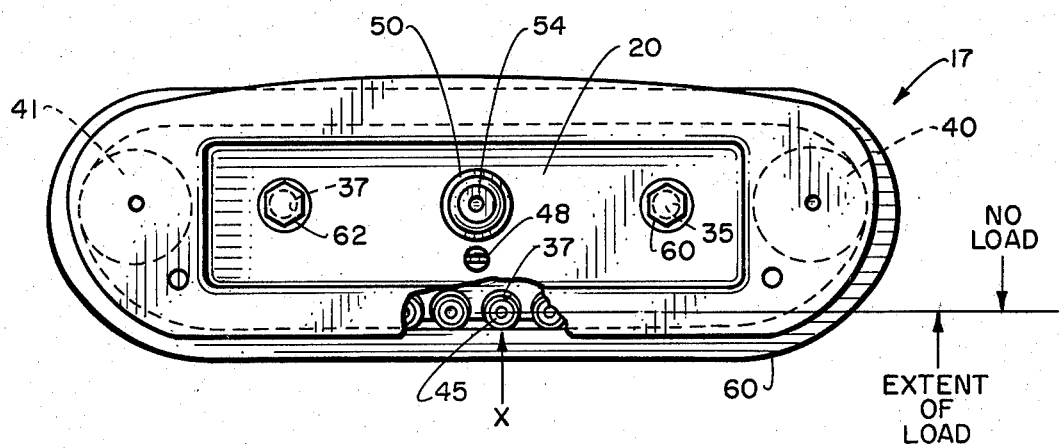
FIG. 2 is a vertical side view of the assembled stair tread engaging device of my invention with parts broken away for convenience of illustration.

Means 17 is shown in vertical cross-sectional assembled view in FIG. 2. The main body portion 20 of means 17 is comprised of a pair of sections 21,22. See FIG. 8.

Figure 3:
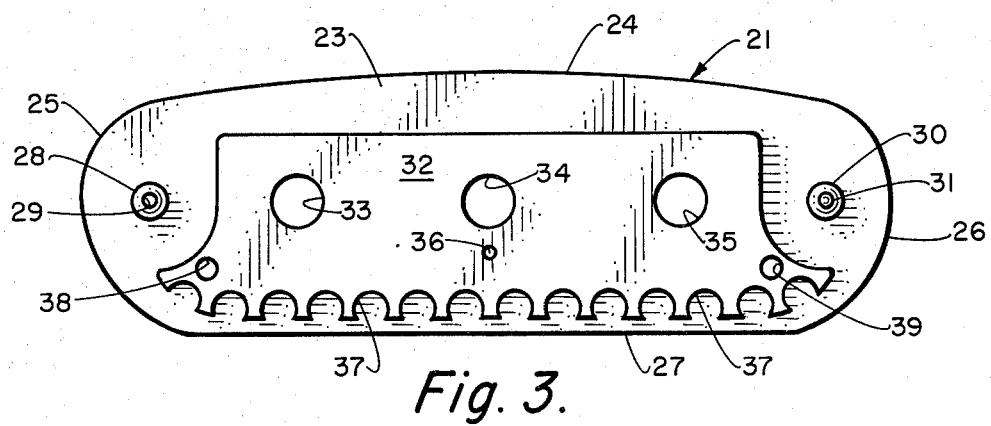
FIG. 3 is a plan view of a component of the device of FIG. 2.

Since sections 21,22 are identical, only one will be described. As can be seen in FIG. 3, section 21 includes an oblong flat main plate 23 having one elongated curved side 24 leading into curved ends 25,26. Ends 25,26 are interconnected by a linear side 27. An apertured boss 28 having aperture 29 therein is provided on plate 23 adjacent end 25 while a solid boss 30, having a pin 31 of smaller dimension thereon, is provided at the opposite end of plate 23 adjacent end 26.

A raised elongated portion 32 is integral with plate 23 having a flat surface with three spaced apertures 33 through 35 extending through portion 32 and plate 23. A smaller diameter aperture 36 extends through both portion 32 and plate 23 adjacent aperture 34.

A plurality of generally circular cavities 37, open at one end, are provided on portion 32 along the side thereof adjacent linear side 27 of plate 23. These cavities 37 are of a diameter to receive individual rollers therein, as will be discussed, with the opening therein of a size sufficient to trap and retain each roller in its own cavity. Although any suitable number may be provided, fourteen cavities 37 are illustrated, the total number obviously depending on the length of means 17 desired and the size of the rollers and cavities. Finally, a pair of apertures 38,39 are provided at each end of portion 32 adjacent ends 25,26, respectively.

Figure 4:
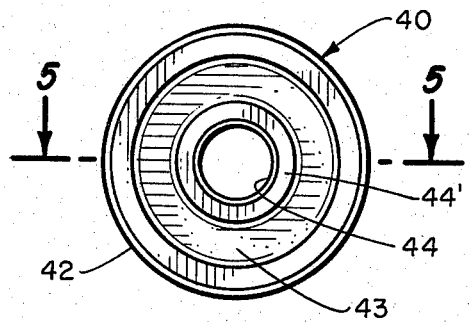
FIG. 4 is a plan view of a roller of the device of FIG. 2.
Figure 5:
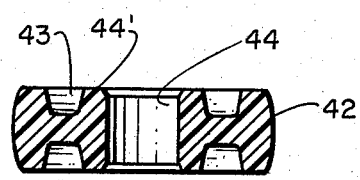
FIG. 5 is a view taken along lines V—V of FIG. 4.

Referring to FIGS. 2, 4 and 5, first rollers 40,41 are shown at each end of means 17. Rollers 40,41, identical to each other, include a circular outer periphery 42, FIG. 4, which may be curved (FIG. 5) interconnected via flange 43 to a central hub 44' surrounding central aperture 44.

Figure 6:
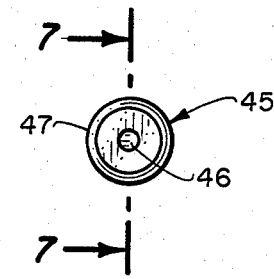
FIG. 6 is an end view of a smaller roller of the device of FIG. 2.
Figure 7:
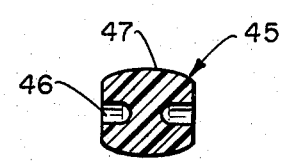
FIG. 7 is a view taken along lines VII—VII of FIG. 6.

The rollers 45 that enter cavities 37 are shown in FIGS. 6 and 7 (and of course assembled in cavities 37 in FIG. 2). Each roller 45 is generally barrel shape with an inner throughbore 46 which may be closed off by a central flange 47 during formation thereof. Of course, rollers 45 may be solid, if desired, or spherical, as will be discussed, and are configured as shown for convenience of manufacture and conservation of parts. Obviously, the same number of rollers 45 is provided as the total number of cavities 37. Rollers 45 are designated second rollers.

Figure 8:
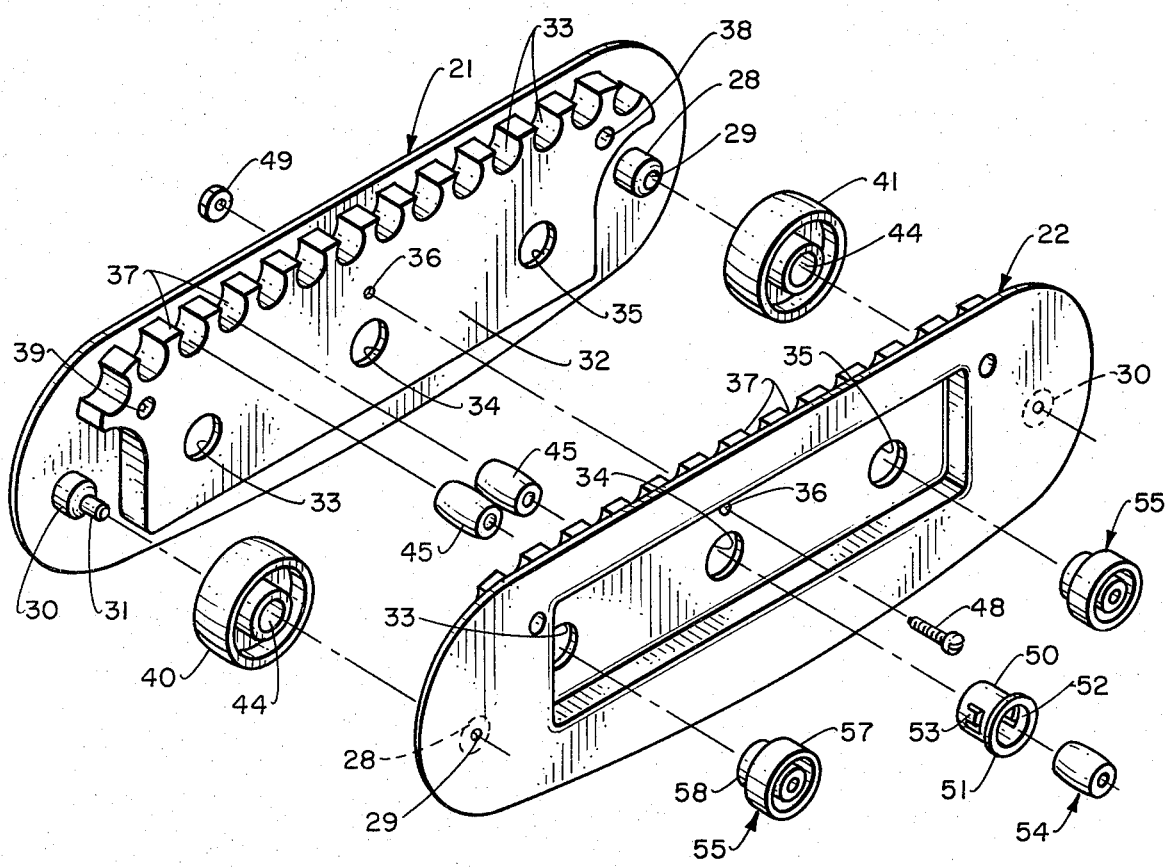
FIG. 8 is an exploded view of the device of FIG. 2.

The assembly of means 17 is shown in exploded view in FIG. 8. Rollers 45 are placed in each respective cavity 37 in section 21 with larger rollers 40,41 placed on bosses 28 and 30.

Plate 22, reversed with respect to plate 21, is now placed over plate 21 with boss 30, passing through aperture 44, having its pin 31 entering aperture 29 of boss 28 on plate 22. In like manner, boss 30 of plate 22 passes through aperture 44 in roller 41 with its pin 31 entering aperture 29 in boss 28 of plate 21. Bolt 48, passing through aperture 36 in plate 22, threads into nut 49 on the other side of plate 21 to secure plate 21 to plate 22. Of course, other securing means, as rivets or the like, may be used in place of nuts and bolts and more than one may be provided. A cap 50, having a peripheral abutment flange 51, a cylindrical body 52 and resilient locking tabs 53 is inserted into aligned apertures 34 in plates 31,32 with a roller insert 54, identical to rollers 45, entering the throughbore 55 of cap 50 and freely movable both therein and therethrough, to lock the two plates 21,22 firmly together, the locking tabs 53 passing through apertures 34 and locked on the outside of plate 21. Finally, a pair of removable bushings 55,56 are provided which enter apertures 33,35, respectively. Roller 45, 54, also designated as 66 is discussed infra.

Figure 9:
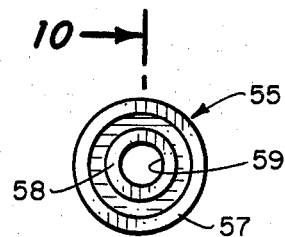
FIG. 9 is a view taken along lines IX—IX of FIG. 8.
Figure 10:
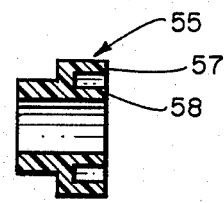
FIG. 10 is a view taken along lines X—X of FIG. 9.

Bushings 55,56 are shown in detail in FIGS. 9 and 10. Each bushing 55,56 has a first cylindrical portion 57 integral with a second cylindrical portion 58, of lesser diameter, with a central throughbore 59. Thus, as shown in FIG. 8, cylindrical portions 58 enter apertures 33,35 with portions 57 abutting against the portions of plate 22 surrounding apertures 33,35.

Figure 11:
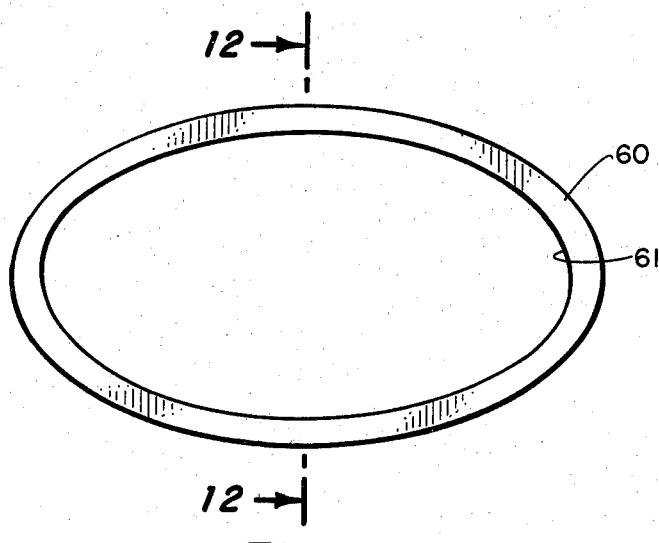
FIG. 11 is a plan view of the belt of the device of FIG. 2.
Figure 12:
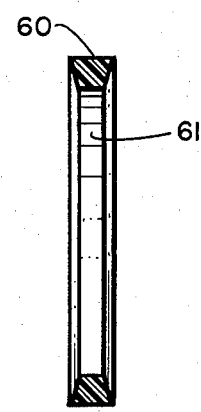
FIG. 12 is a view taken along lines XII—XII of FIG. 11.

The tread for means 17 is provided by a V-belt 60 (FIG. 11) of rubber or the like having a generally trapezoidally-shaped cross-section as shown in FIG. 12. Belt 60 can be added after assembly of plates 21,22 which is not the case with prior art tread engaging devices. As can be seen in assembled view in FIG. 2, the short flat side (side 61 in FIG. 12) of belt 60 makes contact with the surface of each roller 45 (see point x in FIG. 2) only at impact points on the steps engaging belt 60 and full contact with all rollers 45 only when belt 60 engages a flat surface, e.g. as in FIG. 2. The belt 60 is held tightly on the plate 21,22 only at sides or ends 25,26.

The rollers 45 thus are provided only along one side of means 17 and rotate in their own cavities and only on their own axes with no translational or forward movement. Thus, if one of the rollers 45 stuck, the balance of them will still be free to rotate freely. Twisting or turning of the hand truck 10 to which means 17 is attached has no effect on the operability of means 17.

The various parts, other than belt 60, and bolt 48 and nut 49, may be made of high impact plastic or the like.

Bushings 55 prevent warpage when means 17 is mounted directly to a plate on hand truck 10 as shown in FIG. 1. This avoids damage to the sidewalls of the hand truck 10. Bushings 55 can be used on either side of means 17 and can vary in width thus accomodating various types of trucks. Apertures 33, 35 (FIG. 2) are used to bolt means 17 to truck 10 (see bolt heads 62 in FIG. 2).

Figure 13:
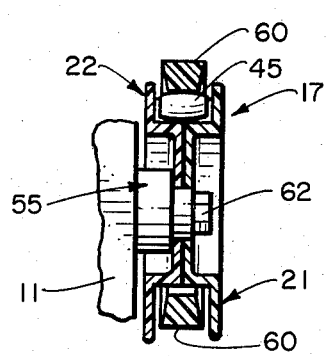
FIG. 13 is a vertical view illustrating a feature of my invention.

FIG. 13 illustrates graphically how bushings 55 may be used. Side member 11 of truck 10 is shown with means 17 secured to member 11 (connecting means not visible). Bushing 55, entering apertures 33, 35 of plates 21, 22, spaces means 17 from member 11. The width of bushing 55 can be varied to provide for any spacing desired.

Figure 14:
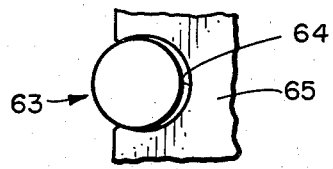
FIG. 14 is a detailed view of a modification of a portion of the device of FIG. 2.
Figure 15:
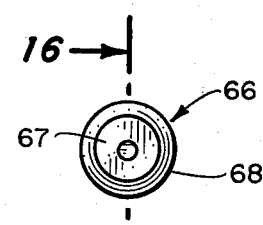
FIG. 15 is an end view of an alternate smaller roller for the device of FIG. 2.
Figure 16:
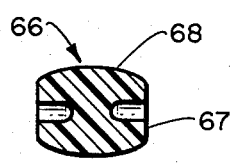
FIG. 16 is a view taken along lines XVI—XVI of FIG. 15.
Figure 17:
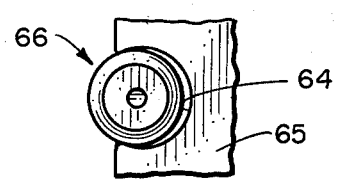
FIG. 17 is a detailed view similar to that of FIG. 14 but with the roller of FIG. 16.

Thus in FIGS. 15 and 16 there is disclosed a barrel-shaped roller 66 having flat end walls 67 and a bulging side wall 68. FIG. 15 is an end view of such a roller, while FIG. 16 is a view taken along the lines XVI—XVI of FIG. 15. Such barrel rollers have been found to be extremely beneficial for use in means 17 in that they can be readily manufactured from light weight plastic such as nylon, and in view of the small surface area impinging upon the belt 60 they allow smooth rotation of the belt. FIG. 17 is similar to FIG. 14 in that it depicts barrel roller 66 within cavity 64. Designator 65 being the sections forming the cavity.

Although barrel shape rollers 45 have been described, as mentioned, and as shown in FIG. 14, spherical rollers, such as ball bearings, which may be plastic, metal, or the like, 63, may be substituted for rollers 45, with like configured spherical cavities 64 in section 65 which are otherwise identical to sections 21, 22, as previously disclosed. Two mating like sections 65 form spherical cavities 64.

While the barrel shape rollers 45 employable may be made of plastic such as nylon or metal such as steel, and spherical rollers such as readily available balls such as steel ball bearings both give rise to satisfactory operations of means 17, I have also found that other configurations can also be employed; e.g. a cylinder, not shown, insertable similar to 66 in cavity 64, per FIG. 17.

OPERATION

In recapitulation it is seen that the plurality of rollers are each disposed within their own individual cavity and in view of the spacing between cavities, that each roller rotates about its own axis, each is not-linearly movable within the device. The construction is such that the V-belt makes full contact with more than one of the rollers only when the V-belt abuts against both a generally flat surface and the said rollers, (stair tread). The belt makes contact with only one of the rollers when a portion of the V-belt engages the edge or lip of a step. Thus as the belt impings upon the lip of the step as the belt slides up the lip, the belt contacts successive rollers, usually no more than 1 or 2 at a time depending upon the length of the contact surface of the belt on the lip of the step. As the belt climbs the lip, the contacted individual rollers rotate clockwise easing the traverse of the belt.

It can be seen that I have described an improved stair tread engaging device which is attachable to any suitable hand truck and effects both reduced friction and prevents jamming. The parts are assembled in a quick and easy manner and are made of inexpensive materials. Twisting or torque of the means 17 has no effect on the operability of the device due to the non-engagement of the rollers. A big advantage of the device herein is that it is a direct substitute for prior art devices used on current handtrucks.

In FIG. 8 and as previously disclosed, cap 50 is seen to serve to lock the two plates 21 and 22 firmly together. I have found that several means of locking plates 21 and 22 can be employed. Firstly, the manner previously discussed wherein roller 54 is reversed into the cavity in cylindrical body 52 to aid in the spreading of locking tabs 53. Secondly, satisfactory results may be obtained when roller 54 is omitted so long as adequate pressure is placed upon flange 51 to ensure the locking of the tab 53. The third mode comprises the entire deletion of both roller 54 and cap 50, it having been found that the use of bolt 48 working in conjunction with the base fit of pin 31 into aperture 29 will suffice to hold plates 21 and 22 together. As can be seen there are two additional apertures 38 and 39 in the two plates 21 and 22. If desired, additional bolts 48 may be placed therethrough to further ensure adequate closure of the bolts.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a hand truck assembly having a wheel and handled frame, including side members, a tread engaging device secured to one of the side members of the frame, said tread engaging device including an endless V-belt for engaging the tread of a stairs and roller means thereon, the improvement which comprises:
said roller means including a plurality of barrell-shaped rollers having flat end walls and a bulging sidewall, each of said rollers being mounted in an individual cavity in said device and rotatable about their own axes, said rollers being generally linearly aligned and non-linearly movable with respect to said device, with said V-belt making full contact with more than one of said rollers only when said V-belt abuts against a generally flatsurface and said rollers, and making contact with only one of said rollers when a portion of said V-belt engages the edge of a stair and impacts against said only one of said rollers, said tread engaging device further including flange means at each of the two ends thereof to maintain said V-belt on said device.

2. In the assembly of claim 1 wherein said V-belt is generally trapezoidal in cross-section having a wide side adapted to abut against the tread of a stair and a side narrower than said wide side adapted to abut against said only one of said rollers.

3. In the assembly of claim 1 wherein said device is comprised of a pair of mating body members secured together in a manner forming an elongated body having curved ends, a first side interconnecting one end of each of said curved ends and a generally linear side interconnecting the other end of each of said curved ends, said mating body members forming said plurality of individual cavities along only said linear side.

4. In the device of claim 3 wherein said cavities are spaced from each other, said rollers in one of said cavities being in a non-contiguous relation with a roller in an adjacent cavity.

5. In the device of claim 3 wherein said V-belt is disposed in a peripheral groove formed by said mating body members, said V-belt being retained tightly in said groove only at said curved ends.

6. In the device of claim 5 including a pair of spaced first V-belt engaging rollers rotatably mounted between said mating body members adjacent each of said curved ends and engaging said V-belt at said curved ends.

7. In the device of claim 3 including at least one generally circular aperture extending through said mating body members, and a bushing removably mounted in said circular aperture, said bushing having a first cylindrical portion and an integral second cylindrical portion of an outer diameter greater than said first cylindrical portion, said first cylindrical portion being disposed in said circular aperture on the side of said device adjacent said truck to thereby provide a spacer between said truck and said device.

8. A stair tread engaging device adapted to be be mounted on a hand truck, said device comprising
an elongated main body formed by a pair of mating body sections each of said body sections having means thereon cooperating to form a plurality of linearly aligned generally circular cavities along only one elongated generally linear side of said main body, each of said cavities opening outwardly of said main body and a barrel shaped second roller, having flat end walls and a bulging sidewall, freely rotatably mounted about its own axis in each of said cavities, said mating body sections forming a peripheral groove around said body, said mating body sections also forming flange means at both ends of said body, said groove having a resilient endless belt mounted therein, said belt being retained by both of said flange means, said belt engaging said rollers when said belt is pressed against said rollers, and a pair of spaced belt engaging first rollers at opposite ends of said main body rotably mounted therein engaging said belt for rotating said belt; said first rollers being disposed above and outwardly from said second rollers.

9. In the device of claim 8 wherein said second rollers are barrel-shaped, having flat end walls and a bulging sidewall, and adapted to engage said belt.

10. In the device of claim 9 wherein said belt is generally trapezoidal in cross-section having a first side outwardly of said main body and a second side parallel to said first side and smaller in length thereof adjacent said bulging sidewalls of said second rollers.

11. In the device of claim 8 wherein fourteen second rollers are employed, one per cavity and at least one bolt is utilized to secure each of said mating body sections to the other.

12. In the device of claim 11 wherein the rollers are barrel shaped and made of plastic.

* * * * *